United States Patent [19]

Weber

[11] Patent Number: 4,957,898

[45] Date of Patent: Sep. 18, 1990

[54] MIXTURE OF YELLOW AND MAGENTA DYES TO FORM A RED HUE FOR COLOR FILTER ARRAY ELEMENT

[75] Inventor: Helmut Weber, Webster, N.Y.

[73] Assignee: Eastman Kodak Company, Rochester, N.Y.

[21] Appl. No.: 340,103

[22] Filed: Apr. 18, 1989

[51] Int. Cl.$^5$ .................. B41M 5/035; B41M 5/26
[52] U.S. Cl. .................................. 503/227; 8/471; 428/195; 428/412; 428/913; 428/914
[58] Field of Search ................ 8/471; 428/195, 412, 428/913, 914; 503/227

[56] References Cited

U.S. PATENT DOCUMENTS 4,698,651 10/1987 Moore et al. .................. 503/227
4,701,439 10/1987 Weaver et al. ................. 503/227

Primary Examiner—Bruce H. Hess
Attorney, Agent, or Firm—Harold E. Cole

[57] ABSTRACT

A thermally-transferred color filter array element comprising a transparent support having thereon a thermally-transferred image comprising a repeating mosaic pattern of colorants in a receiving layer, one of the colorants being a mixture of a yellow dye and a magenta dye to form a red hue, said yellow dye having the formula:

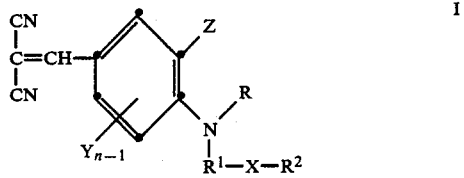

wherein
R is a substituted or unsubstituted alkyl grou of from 1 to about 10 carbon atoms, a cycloalkyl group of from about 5 to about 7 carbon atoms; or represents the atoms which when taken together with Z forms a 5- or 6-membered ring;
$R^1$ is an alkylene or substituted alkylene group;
X is —OJO—, —OJ—, —OJNR$^3$—, —NR$^3$J—, —NR$^3$JNR$^3$, —JNR$^3$— or —NR$^3$JO—;
J is CO or SO$_2$;
$R^3$ is hydrogen; a substituted or unsubstituted alkyl group of from 1 to about 10 carbon atoms; a substituted or unsubstituted aryl group of from about 6 to about 10 carbon atoms; or represents the atoms which when taken together with $R^2$ forms a 5- or 6-membered ring;
$R^2$ is a substituted or unsubstituted alkyl group of from 1 to about 10 carbon atoms; a cycloalkyl group of from about 5 to about 7 carbon atoms; a substituted or unsubstituted aryl group of from about 6 to about 10 carbon atoms; or represents the atoms which when taken together with $R^3$ forms a 5- or 6-membered ring;
Z is hydrogen or represents the atoms which when taken together with R forms a 5- or 6-membered ring;
Y is a substituted or unsubstituted alkyl or alkoxy group of from 1 to about 6 carbon atoms or halogen; and
n is a positive integer from 1 to 4; and said magenta dye having the formula:

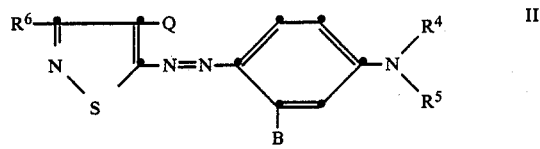

wherein $R^4$ and $R^5$ may each independently be hydrogen, substituted or unsubstituted alkyl or allyl of from 1 to about 6 carbon atoms, substituted or unsubstituted cycloalkyl of from about 5 to about 7 carbon atoms, substituted or unsubstituted aryl of from about 5 to about 10 carbon atoms; or $R^4$ and $R^5$ may be taken together to form a ring; or a 5- or 6-membered heterocyclic ring may be formed with $R^4$ or $R^5$, the nitrogen to which $R^4$ or $R^5$ is attached, and either carbon atom ortho to the carbon attached to said nitrogen atom;
$R^6$ may be hydrogen, substituted or unsubstituted alkyl of from 1 to about 6 carbon atoms, substituted or unsubstituted aryl of from about 5 to about 10 carbon atoms, alkylthio or halogen;
B may be substituted or unsubstituted alkyl of from 1 to about 6 carbon atoms, substituted or unsubstituted aryl of from about 5 to about 10 carbon atoms or NHA, where A is an acyl or sulfonyl radical; and
Q may be cyano, thiocyanato, alkylthio or alkoxycarbonyl.

20 Claims, No Drawings

MIXTURE OF YELLOW AND MAGENTA DYES TO FORM A RED HUE FOR COLOR FILTER ARRAY ELEMENT

This invention relates to the use of a mixture of a yellow dye and a magenta dye to form a red hue for a thermally transferred color filter array element which is used in various applications such as a liquid crystal display device.

In recent years, thermal transfer systems have been developed to obtain prints from pictures which have been generated electronically from a color video camera. According to one way of obtaining such prints, an electronic picture is first subjected to color separation by color filters. The respective color separated images are then converted into electrical signals. These signals are then operated on to produce cyan, magenta and yellow electrical signals. These signals are then transmitted to a thermal printer. To obtain the print, a cyan, magenta or yellow dye donor element is placed face to face with a dye receiving element. The two are then inserted between a thermal printing head and a platen roller. A line type thermal printing head is used to apply heat from the back of the dye donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nob 4, 1986, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB No. 2,083,726A, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving phototube display, mounted electronic display, or TV image display. Various attempts have been made to incorporate a color display using a color filter array into these devices. However, none of the color array systems for liquid crystal display devices so far proposed have been successful in meeting all the users needs.

One commercially available type of color filter array which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor intensive steps, requires careful alignment, is time consuming and very costly.

In addition, a color filter array element to be used in a liquid crystal display device may have to undergo rather severe heating and treatment steps during manufacture. For example, a transparent electrode layer, such as indium tin oxide, is usually vacuum sputtered onto the color filter array element. This may take place at temperatures elevated as high as 200° C. for times which may be one hour or more. This is followed by coating with a thin alignment layer for the liquid crystals, such as a polyimide. Regardless of the alignment layer used, the surface finish of this layer in contact with the liquid crystals is very important and may require rubbing or may require curing for several hours at an elevated temperature. These treatment steps can be very harmful to many color filter array elements, especially those with a gelatin matrix.

It is thus apparent that dyes used in color filter arrays for liquid crystal displays must have a high degree of heat and light stability above the requirements desired for dyes used in conventional thermal dye transfer imaging.

While a red dye may be formed from a mixture of one or more magenta and one or more yellow dyes, not all such combinations will Produce a dye mixture with the correct hue for a color filter array. Further, when a dye mixture with the correct hue is found, it may not have the requisite stability to light. An additional requirement is that no single dye of the mixture can have an adverse effect on the stability to light or crystallinity of any of the other dye components.

U.S. Pat. No. 4,701,439 describes yellow dyes useful in thermal printing. There is no disclosure in that patent, however, that it may be mixed with a particular magenta dye to form a red dye useful in a color filter array.

U.S. Pat. No. 4,698,651 describes magenta dyes useful in thermal printing. There is no disclosure in that patent, however, that it may be mixed with a particular yellow dye to form a red dye useful in a color filter array.

It would be desirable to provide a color filter array element having high quality, good sharpness and which could be obtained easily and at a lower price than those of the prior art. It would also be desirable to provide such a color filter array element having a red dye of the correct hue and which would have good stability to light.

These and other objects are achieved in accordance with this invention which comprises a thermally transferred color filter array element comprising a transparent support having thereon a thermally transferred image comprising a repeating mosaic pattern of colorants in a receiving layer, one of the colorants being a mixture of a yellow dye and a magenta dye to form a red hue, said yellow dye having the formula:

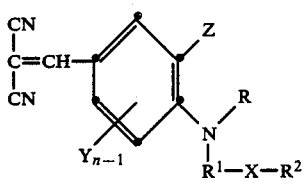

wherein

R is a substituted or unsubstituted alkyl group of from 1 to about 10 carbon atoms, such as methyl, ethyl, propyl, isopropyl, butyl, pentyl, hexyl or such alkyl groups substituted with hydroxy, acyloxy, alkoxy, aryl, cyano, acylamido, halogen, etc.; a cycloalkyl group of from about 5 to about 7 carbon atoms such as cyclopentyl, cyclohexyl, p-methylcyclohexyl, etc.; or represents the atoms which when taken together with Z forms a 5- or 6-membered ring;

$R^1$ is an alkylene or substituted alkylene group such as methylene, ethylene, hexylene, etc. or alkylene substituted with hydroxy, alkoxy, aryl, cyano, halogen, etc.;

X is —OJO—, —OJ—, —JO—, —OJNR$^3$—, —NR$^3$J—, —NR$^3$JNR$^3$, —JNR$^3$— or —NR$^3$JO—;

J is CO or $SO_2$;

$R^3$ is hydrogen; a substituted or unsubstituted alkyl group of from 1 to about 10 carbon atoms such as those listed above for R; a substituted or unsubstituted aryl group of from about 6 to about 10 carbon atoms such as phenyl, p-tolyl, m-chlorophenyl, p-methoxyphenyl, m-bromophenyl, o-tolyl, etc.; or represents the atoms which when taken together with $R^2$ forms a 5- or 6-membered ring;

$R^2$ is a substituted or unsubstituted alkyl group of from 1 to about 10 carbon atoms, such as those listed above for R;, a cycloalkyl group of from about 5 to about 7 carbon atoms, such as those listed above for R; a substituted or unsubstituted aryl group of from about 6 to about 10 carbon atoms, such as those listed above for $R^3$; or represents the atoms which when taken together with $R^3$ forms a 5- or 6-membered ring;

Z is hydrogen or represents the atoms which when taken together with R forms a 5- or 6-membered ring;

Y is a substituted or unsubstituted alkyl or alkoxy group of from 1 to about 6 carbon atoms, such as those listed above for R, methoxy, ethoxy, etc., or halogen such as chloro, bromo or fluoro; and n is a positive integer from 1 to 4; and said magenta dye having the formula:

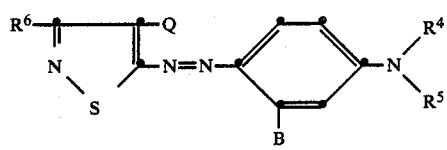

wherein:

$R^4$ and $R^5$ may each independently be hydrogen; substituted or unsubstituted alkyl or allyl of from 1 to about 6 carbon atoms such as methyl, ethyl, propyl, isopropyl, butyl, pentyl, hexyl or such alkyl groups substituted with hydroxy, acyloxy, alkoxy, aryl, cyano, acylamido, halogen, etc.; substituted or unsubstituted cycloalkyl of from 5 to about 7 carbon atoms such as cyclopentyl, cyclohexyl, p-methylcyclohexyl, etc.; or substituted or unsubstituted aryl of from about 5 to about 10 carbon atoms such as phenyl, p-tolyl, m-chlorophenyl, p-methoxyphenyl, m-bromophenyl, o-tolyl, etc.; or $R^4$ and $R^5$ may be taken together to form a ring such as pentamethylene, hexamethylene, etc.; or a 5-or 6-membered heterocyclic ring may be formed with $R^4$ or $R^5$, the nitrogen to which $R^4$ or $R^5$ is attached, and either carbon atom ortho to the carbon attached to the nitrogen atom;

$R^6$ may be hydrogen; substituted or unsubstituted alkyl of from 1 to about 6 carbon atoms such as those listed above for $R^4$ and $R^5$; substituted or unsubstituted aryl of from about 5 to about 10 carbon atoms such as phenyl, p-tolyl, m-chlorophenyl, p-methoxyphenyl, m-bromophenyl, o-tolyl, etc.; alkylthio or halogen;

B may be substituted or unsubstituted alkyl of from 1 to about 6 carbon atoms or substituted or unsubstituted aryl of from about 5 to about 10 carbon atoms such as such as those listed above for $R_3$; or NHA, where A is an acyl or sulfonyl radical such as formyl, lower alkanoyl, aroyl, cyclohexylcarbonyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, sulfamoyl, lower alkylsulfamoyl, furoyl, etc; and Q may be cyano, thiocyanato, alkylthio or alkoxycarbonyl.

Yellow dyes according to formula I useful in the invention are described in U.S. Pat. No. 4,701,439, the disclosure of which is hereby incorporated by reference.

In a preferred embodiment of the invention, R in the above structural formula I represents the atoms which are taken together with Z to form a 6-membered ring. In another preferred embodiment of the invention, X is —OCONH— or —OCO—. In yet another preferred embodiment of the invention, $R^1$ is ethylene. In yet still another preferred embodiment of the invention, X is —NCH$_3$SO$_2$— or —NR$^3$J—, wherein J is CO and $R^3$ is combined with $R^2$ to form a 5- or 6-membered ring. In yet still another preferred embodiment of the invention, $R^2$ is a substituted aryl group of from about 6 to about 10 carbon atoms or $C_6H_5$.

The compounds according to formula I of the invention may be prepared by any of the processes disclosed in U.S. Pat. Nos. 3,917,604, 4,180,663 and 3,247,211, the disclosures of which are hereby incorporated by reference.

Specific yellow dyes useful in the invention include the following:

| Yellow Dyes |
| --- |
| 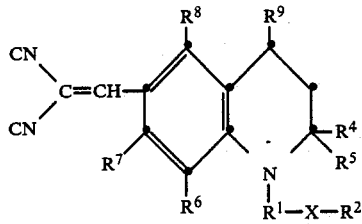 |

| Compound No. | $R^9$ | $R^4$ | $R^5$ | $R^6$ | $R^7$ | $R^8$ | $R^1$ | $X-R^2$ |
| --- | --- | --- | --- | --- | --- | --- | --- | --- |
| A | $CH_3$ | $CH_3$ | $CH_3$ | H | $CH_3$ | H | $C_2H_4$ | $OCNHC_6H_5$ (C=O) |
| B | $CH_3$ | $CH_3$ | $CH_3$ | H | H | H | $C_2H_4$ | $OCNHC_6H_5$ (C=O) |
| C | H | H | $CH_3$ | H | $CH_3$ | H | $C_2H_4$ | $OCNHC_6H_5$ (C=O) |
| D | H | H | $CH_3$ | $OCH_3$ | H | $CH_3$ | $C_2H_4$ | $OCNHC_6H_5$ (C=O) |
| E | $CH_3$ | $CH_3$ | $CH_3$ | H | $CH_3$ | H | $CH_2CH(CH_3)$ | $OCNHC_6H_5$ (C=O) |
| F | $CH_3$ | $CH_3$ | $CH_3$ | H | $CH_3$ | H | $CH_2CHCH_2$, $OCCH_3$ (C=O) | $OCCH_3$ (C=O) |
| G | $CH_3$ | $CH_3$ | $CH_3$ | H | $CH_3$ | H | $CH_2CHCH_2$, $OCNHC_2H_5$ (C=O) | $OCNHC_2H_5$ (C=O) |
| H | $CH_3$ | $CH_3$ | $CH_3$ | H | $CH_3$ | H | $CH_2CH_2CH_2$ | $NHCNHC_6H_5$ (C=O) |
| I | $CH_3$ | $CH_3$ | $CH_3$ | H | $CH_3$ | H | $CH_2CH_2CH_2$ | $NHCOC_2H_5$ (C=O) |
| J | $CH_3$ | $CH_3$ | $CH_3$ | H | $CH_3$ | H | $CH_2CH_2$ | $OC-C_6H_4-COCH_3$ (diester of terephthalic) |
| K | H | H | $CH_3$ | H | Cl | H | $CH_2CH_2$ | $OCNH-C_6H_4-Cl$ (C=O) |
| L | H | H | $CH_3$ | H | $CH_3$ | H | $CH_2CHCH_2$, $OCOC_2H_5$ (C=O) | $OCOC_2H_5$ |
| M | H | H | $CH_3$ | H | $CH_3$ | H | $CH_2CH_2$ | $NHC(O)-C_6H_5$ |

-continued
Yellow Dyes

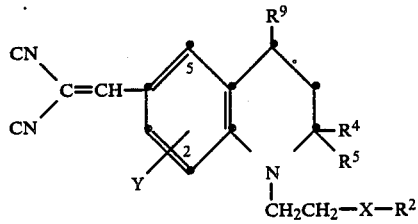

| Compound No. | $R^7$ | $R^4$ | $R^5$ | Y | $X-R^2$ |
|---|---|---|---|---|---|
| N | $CH_3$ | $CH_3$ | $CH_3$ | 3-$CH_3$ | $-OCO-NH(C_6H_5)$ |
| O | $CH_3$ | $CH_3$ | $CH_3$ | 3-$CH_3$ 2-$OCH_3$ | $-OCO-CH_2OC_6H_5$ |
| P | $CH_3$ | $CH_3$ | $CH_3$ | 5-$CH_3$ 2-$OCH_3$ | $-OCO-NH[C_6H_3-3,5-(OCH_3)_2]$ |
| Q | $CH_3$ | $CH_3$ | $CH_3$ | 5-$CH_3$ 2-$OCH_3$ | $-OCO-(C_6H_4-4-CO_2CH_3)$ |
| R | $CH_3$ | $CH_3$ | $CH_3$ | 5-$CH_3$ | $-N(-CH_3)(-SO_2C_6H_5)$ |
| S | $CH_3$ | $CH_3$ | $CH_3$ | 3-$CH_3$ | phthalimido group |
| T | | | | | structure shown |
| U | | | | | structure shown |

Magenta dyes according to formula II useful in the invention are described in U.S. Pat. No. 4,698,651, the disclosure of which is hereby incorporated by reference. The compounds of formula II of the invention may be prepared by established synthetic procedures such as are described in Example 2 of U.S. Pat. No. 3,770,370 of Weaver et al.

In a preferred embodiment of the invention, $R^6$ in formula II is methyl and Q is CN. In another preferred embodiment of the invention, B is $-NHCOCH_3$. In still another preferred embodiment of the invention, $R^4$ is $C_2H_5$ and $R^5$ is $CH_2C_6H_5$, cyclohexyl or $CH_2CH_2O_2CCH_3$. In yet another preferred embodiment of the invention, $R^4$ and $R^5$ are each n-$C_3H_7$ or $C_2H_5$.

Specific magenta dyes useful in the invention include the following:

Magenta Dyes

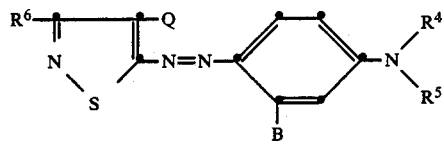

| Compound No. | $R^4$ | $R^5$ | B | $R^6$ | Q |
|---|---|---|---|---|---|
| 1 | $C_2H_5$ | $CH_2C_6H_5$ | $-NH-\overset{O}{\underset{\|}{C}}CH_3$ | $CH_3$ | CN |
| 2 | $C_2H_5$ | (thiophene) | $-NH-\overset{O}{\underset{\|}{C}}CH_3$ | $CH_3$ | CN |
| 3 | $C_2H_5$ | $CH_2CH_2O_2CCH_3$ | $-NH-\overset{O}{\underset{\|}{C}}CH_3$ | $CH_3$ | CN |
| 4 | $n\text{-}C_3H_7$ | $n\text{-}C_3H_7$ | $-NH-\overset{O}{\underset{\|}{C}}CH_3$ | $CH_3$ | CN |
| 5 | H | $CH_2CH_2OCH_3$ | $-NH-\overset{O}{\underset{\|}{C}}CH_3$ | H | CN |
| 6 | $-CH_2CH_2\overset{O}{\underset{\|}{O}}CCH_3$ | $-CH_2CH_2O_2CCH_3$ | $-NH-\overset{O}{\underset{\|}{C}}CH_3$ | H | CN |
| 7 | H | $-CH_2CH_2CN$ | $-NH-SO_2-C_6H_5$ | $C_2H_5$ | CN |
| 8 | $CH_2CH_2OH$ | $-C_2H_5$ | $-NH-\overset{O}{\underset{\|}{C}}CH_2OCH_3$ | $C_6H_5$ | CN |
| 9 | $C_2H_5$ | $CH_2C_6H_5$ | $-NH-\overset{O}{\underset{\|}{C}}OC_2H_5$ | $CH_2C_6H_5$ | CN |
| 10 | $C_2H_5$ | $C_2H_5$ | $-NHSO_2CH_3$ | $CH_2CH_2O_2CCH_3$ | CN |
| 11 | $C_2H_5$ | $-CH_2CH_2\overset{H}{\underset{\|}{N}}\overset{O}{\underset{\|}{C}}C_6H_5$ | $-NH-\overset{O}{\underset{\|}{C}}CH_3$ | $n\text{-}C_3H_7$ | CN |
| 12 | $C_2H_5$ | $-CH_2CH_2O\overset{O}{\underset{\|}{C}}NHC_6H_5$ | $-NH-\overset{O}{\underset{\|}{C}}CH_3$ | $CH_2CH_2CN$ | CN |
| 13 | $n\text{-}C_3H_7$ | (thiophene) | $-NH-\overset{O}{\underset{\|}{C}}CH_3$ | (thiophene) | CN |
| 14 | $C_2H_5$ | $CH_2C_6H_5$ | $-NHCOC_6H_5$ | $CH_3$ | CN |
| 15 | $CH_3$ | $CH_3$ | $-NHCOCF_3$ | $CH_3$ | CN |
| 16 | H | $CH_2CH(CH_3)CH_2OCH_3$ | $-NHCOCH_3$ | $CH_3$ | CN |
| 17 | H | $CH(CH_3)CH_2CH_2CH(CH_3)_2$ | $-NHCOCH_3$* | $CH_3$ | CN |
| 18 | $C_2H_5$ | $C_2H_5$ | $-NHCONHC_6H_5$ | $CH_3$ | CN |
| 19 | $C_2H_5$ | $C_2H_5$ | $-NHSO_2-\text{C}_6H_4-CH_3$ | $CH_3$ | CN |
| 20 | $C_2H_5$ | $C_2H_5$ | $-NHSO_2CH_3$ | $CH_3$ | CN |
| 21 | $C_2H_5$ | $CH_2CH_2NHCOCH_3$ | $CH_3$ | $CH_3$ | CN |
| 22 | $C_2H_5$ | $CH_2CH_2OCONHC_6H_5$ | $CH_3$ | $CH_3$ | CN |

-continued

Magenta Dyes

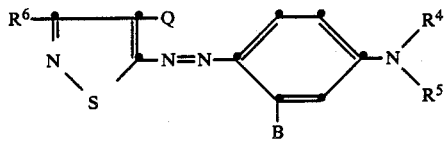

| Compound No. | R⁴ | R⁵ | B | R⁶ | Q |
|---|---|---|---|---|---|
| 23 | C₂H₅ | CH₂CH₂—N(pyrrolidine-2,5-dione) | CH₃ | CH₃ | CN |
| 24 | n-C₃H₇ | n-C₃H₇ | —NHCOCH₃ | —SCH₃ | CN |
| 25 | C₂H₅ | CH₂CH₂OCOCH₃ | —NHCOCH₃ | —SCH₃ | CN |
| 26 | C₂H₅ | C₂H₅ | —NHCOCH₃ | Cl | CN |
| 27 | C₂H₅ | C₂H₅ | —NHCOCH₃ | CH₃ | —SCN |
| 28 | C₂H₅ | CH₂C₆H₅ | —NHCOCH₃ | CH₃ | —CO₂C₂H₅ |
| 29 | C₂H₅ | C₂H₅ | —NHCOCH₃ | CH₃ | —SCH₂CH₂OCOCH₃ |

30

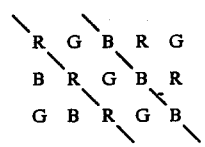

*also has a CH₃ group p- to B

The dye receiving layer of the color filter array element of the invention may comprise, for example, sucrose acetate or polymers such as a polycarbonate, a polyurethane, a polyester, a polyvinyl chloride, a polyamide, a polystyrene, an acrylonitrile, a Polycaprolactone or mixtures thereof. The dye-receiving layer may be present in any amount which is effective for the intended purpose. In general, good results have been obtained at a concentration of from about 0.25 to about 5 g/m².

In a preferred embodiment of the invention, the receiving layer comprises a polycarbonate binder having a $T_g$ greater than about 200° C. as described in application Ser. No. 07/334,269 of Harrison et al., filed Apr. 6, 1989, entitled "Color Filter Array Element With Polycarbonate Receiving Layer", the disclosure of which is hereby incorporated by reference. The term "polycarbonate" as used herein means a polyester of carbonic acid and one or more glycols or dihydric phenols. In another preferred embodiment, the polycarbonate is derived from a bisphenol component comprising a diphenyl methane moiety. Examples of such polycarbonates include those derived from 4,4'-(hexahydro-4,7-methanoindene-5-ylidene)bisphenol, 2,2', 6,6'-tetrachlorobisphenol-A and 4,4'- (2-norbornylidene)bisphenol.

In another preferred embodiment of the invention, the mosaic pattern which is obtained by the thermal transfer process consists of a set of red, green and blue additive primaries.

In another preferred embodiment of the invention, each area of primary color and each set of primary colors are separated from each other by an opaque area, e.g., black grid lines. This has been found to give improved color reproduction and reduce flare in the displayed image.

The size of the mosaic set is normally not critical since it depends on the viewing distance. In general, the individual pixels of the set are from about 50 to about 300 μm. They do not have to be of the same size.

In a preferred embodiment of the invention, the repeating mosaic pattern of dye to form the color filter array consists of uniform, square, linear repeating areas, with one color diagonal displacement as follows:

```
  R   G   B   R   G
B   R   G   B   R
  G   B   R   G   B
```

In another Preferred embodiment, the above squares are approximately 100 μm.

As noted above, the color filter array elements of the invention are used in various display devices such as a liquid crystal display device. Such liquid crystal display devices are described, for example, in UK Patents Nos. 2,154,355; 2,130,781; 2,162,674 and 2,161,971.

A process of forming a color filter array element according to the invention comprises
  (a) imagewise heating a dye donor element comprising a support having thereon a dye layer as described above, and (b) transferring Portions of the dye layer to a dye receiving element comprising a transparent support having thereon a dye receiving layer,
the imagewise heating being done in such a way as to produce a repeating mosaic pattern of dyes to form the color filter array element.

Various methods can be used to supply energy to transfer dye from the dye donor to the transparent support to form the color filter array of the invention. There may be used, for example, a thermal print head. A high intensity light flash technique with a dye donor containing an energy absorptive material such as carbon black or a non subliming light absorbing dye may also be used. This method is described more fully in U.K. Application No. 8824366.2 by Simons filed Oct. 18, 1988, the disclosure of which is hereby incorporated by reference.

Another method of transferring dye from the dye donor to the transparent support to form the color filter array of the invention is to use a heated embossed roller as described more fully in U.K. Application No. 8824365.4 by Simons filed Oct. 18, 1988, the disclosure of which is hereby incorporated by reference.

In a preferred embodiment of the invention, a laser is used to supply energy to transfer dye from the dye donor to the receiver as described more fully in U.S. Ser. No. 259,080, filed Oct. 18, 1988 of DeBoer entitled "Color Filter Array Element Obtained by Laser induced Thermal Dye Transfer", the disclosure of which is hereby incorporated by reference.

If a laser or high intensity light flash is used to transfer dye from the dye donor to the receiver, then an additional absorptive material is used in the dye donor. Any material that absorbs the laser or light energy may be used such as carbon black or non-volatile infrared absorbing dyes or pigments which are well known to those skilled in the art. Cyanine infrared absorbing dyes may also be employed with infrared diode lasers as described in DeBoer application Ser. No. 221,163 filed July 9, 1988, the disclosure of which is hereby incorporated by reference.

A dye donor element that is used to form the color filter array element of the invention comprises a support having thereon a mixture of dyes to form a red hue as described above along with other colorants such as imaging dyes or pigments to form the green and blue areas. Other imaging dyes can be used in such a layer provided they are transferable to the dye receiving layer of the color array element of the invention by the action of heat. Especially good results have been obtained with sublimable dyes. Examples of additive sublimable dyes include anthraquinone dyes, e.g., Kayalon Polyol Brilliant Blue N-BGM ® (Nippon Kayaku Co., Ltd.); azo dyes such as Kayalon Polyol Brilliant Blue BM ® and Kayalon Polyol Dark Blue 2BM ® (Nippon Kayaku Co., Ltd.); direct dyes such as Direct Dark Green B ® (Mitsubishi Chemical Industries, Ltd.); basic dyes such as Sumicacryl Blue 6G ® (Sumitomo Chemical Co., Ltd.), and Aizen Malachite Green ® (product of Hodogaya Chemical Co., Ltd.). Examples of subtractive dyes useful in the invention include the following:

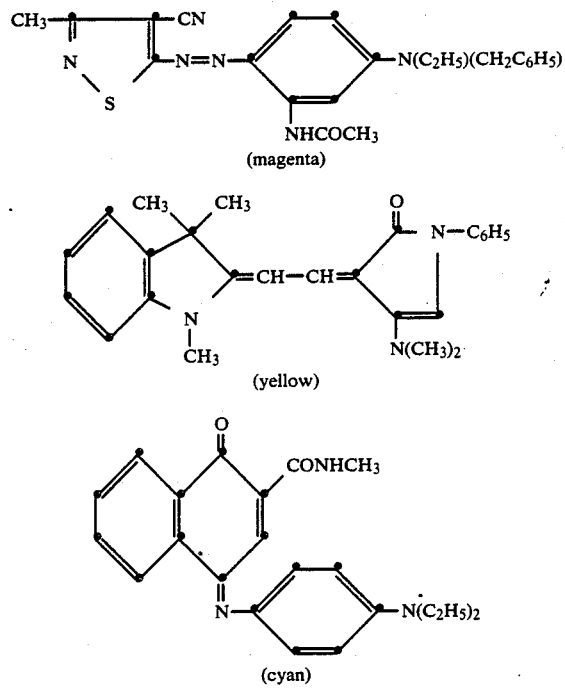

or any of the dyes disclosed in U.S. Pat. No. 4,541,830. The above cyan, magenta, and yellow subtractive dyes may be employed in various combinations, either in the dye donor itself or by being sequentially transferred to the dye image receiving element, to obtain the other desired blue and green additive primary colors. The dyes may be mixed within the dye layer or transferred sequentially if coated in separate dye layers. The dyes may be used at a coverage of from about 0.05 to about 1 g/m$^2$.

The imaging dye, and an infrared absorbing material if one is present, are dispersed in the dye donor element in a polymeric binder such as a cellulose derivative, e.g., cellulose acetate hydrogen Phthalate, cellulose acetate, cellulose acetate propionate, cellulose acetate butyrate, cellulose triacetate; a polycarbonate; poly(styrene-co-acrylonitrile), a poly(sulfone) or a Poly(phenylene oxide). The binder may be used at a coverage of from about 0.1 to about 5 g/m$^2$.

The dye layer of the dye donor element may be coated on the support or printed thereon by a printing technique such as a gravure process.

Any material can be used as the support for the dye donor element provided it is dimensionally stable and can withstand the heat generated by the thermal transfer device such as a laser beam. Such materials include polyesters such as poly(ethylene terephthalate); polyamides; polycarbonates; glassine paper; condenser paper; cellulose esters; fluorine Polymers; Polyethers; polyacetals; polyolefins; and Polyimides. The support generally has a thickness of from about 2 to about 250 82 m. It may also be coated with a subbing layer, if desired.

The support for the dye image receiving element or color filter array element of the invention may be any transparent material such as polycarbonate, poly(ethylene terephthalate), cellulose acetate, polystyrene, etc. In a preferred embodiment, the support is glass.

After the dyes are transferred to the receiver, the image may be treated to further diffuse the dye into the dye receiving layer in order stabilize the image. This may be done by radiant heating, solvent vapor, or by contact with heated rollers. The fusing step aids in preventing fading upon exposure to light and surface abrasion of the image and also tends to prevent crystallization of the dyes. Solvent vapor fusing may also be used instead of thermal fusing.

Several different kinds of lasers could conceivably be used to effect the thermal transfer of dye from a donor sheet to the dye receiving element to form the color filter array element in a preferred embodiment of the invention, such as ion gas lasers like argon and krypton; metal vapor lasers such as copper, gold, and cadmium., solid state lasers such as ruby or YAG, or diode lasers such as gallium arsenide emitting in the infrared region from 750 to 870 nm. However, in practice, the diode lasers offer substantial advantages in terms of their small size, low cost, stability, reliability, ruggedness, and ease of modulation. In practice, before any laser can be used to heat a dye donor element, the laser radiation must be absorbed into the dye layer and converted to heat by a molecular process known as internal conversion. Thus, the construction of a useful dye layer will depend not only on the hue, sublimability and intensity of the image dye, but also on the ability of the dye layer to absorb the radiation and convert it to heat.

Lasers which can be used to transfer dye from the dye donor element to the dye image receiving element to form the color filter array element in a preferred embodiment of the invention are available commercially. There can be employed, for example, Laser Model SDL 2420 H2 ® from Spectrodiode Labs, or Laser Model SLD 304 V/W ® from Sony Corp.

The following example is provided to illustrate the invention.

EXAMPLE

A red dye donor was prepared by coating on a gelatin subbed transparent 175 μm poly(ethylene terephthalate) support a dye layer containing magenta dye 1 illustrated above (0.21 g/m²) and yellow dye A illustrated above (0.23 g/m²) in a cellulose acetate propionate (2.5% acetyl, 46% propionyl) binder (0.26 g/m²) coated from a 1-propanol, butanone, toluene and cyclopentanone solvent mixture. The dye layer also contained Raven Black No. 1255 ® (Columbia Carbon Co.) (0.21 g/m ) ball milled to submicron particle size, FC 431 ® dispersing agent (3M Company) (0.01 g/m ) and Solsperse ® 2400 dispersing agent (ICI Corp.) (0.03 g/m²).

A control red dye donor was prepared as described above except that it contained the following merocyanine yellow dye (0.21 g/m²) as described in U.S. Pat. No. 4,743,528 instead of yellow dye A;

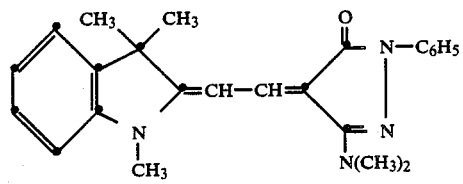

A dye receiver was prepared by spin-coating the following layers on a 53μ thick flat surfaced borosilicate glass:
(1) Subbing layer of duPont VM 651 Adhesion Promoter as a 1% solution in a methanol water solvent mixture (0.5 μm thick layer equivalent to 0.54 g/m²), and
(2) Receiver layer of a polycarbonate of 4,4'-(hexahydro 4,7 methanoindene 5-ylidene)bisphenol, as described in U.S. application Ser. No. 07/334,269, of Harrison et al. referred to above, from methylene chloride solvent (2.5 g/m²).

The dye-donor was placed face down upon the dye receiver. A Mecablitz ® Model 45 (Metz·AG Company) electronic flash unit was used as a thermal energy source. It was placed 40 mm above the dye donor using a 45-degree mirror box to concentrate the energy from the flash unit to a 25×50 mm area. The dye transfer area was masked to 12×42 mm. The flash unit was flashed once to produce a transferred transmission density of 1.4 at the maximum absorption of the dye mixture.

The same flash transfer procedure was used for the control coating producing a transferred transmission density of 1.4 at the maximum density of the dye mixture.

Each transferred area was then treated with a stream of air saturated with methylene chloride vapor at 22° C. for 10 minutes to further diffuse the dyes into the dye receiving layer.

The Blue and Green Status A densities of the transferred area were read. Each transferred area was then subjected to exposure for 4 days, 50 kLux, 5400° K., approximately 25% RH. The densities were then re read to determine the percent dye loss due to light fade. The following results were obtained:

| Receiver | Blue Status A Density | | | Green Status A Density | | |
|---|---|---|---|---|---|---|
| | Init. | Faded | % Loss | Init. | Faded | % Loss |
| Control | 1.43 | 0.91 | 36 | 1.35 | 1.19 | 12 |
| Invention | 1.25 | 1.12 | 10 | 1.43 | 1.28 | 10 |

The above results indicate that the receiver containing the dyes according to the invention had better stability to light than the control receiver containing a merocyanine yellow dye.

The invention has been described in detail with particular reference to preferred embodiments thereof, but it will be understood that variations and modifications can be effected within the spirit and scope of the invention.

What is claimed is:

1. A thermally-transferred color filter array element comprising a transparent support having thereon a thermally transferred image comprising a repeating mosaic pattern of colorants in a receiving layer, one of said colorants being a mixture of a yellow dye and a magenta dye to form a red hue, said yellow dye having the formula:

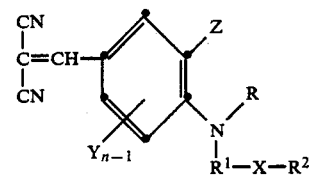

wherein
R is a substituted or unsubstituted alkyl group of from 1 to about 10 carbon atoms; a cycloalkyl group of from about 5 to about 7 carbon atoms; or represents the atoms which when taken together with Z forms a 5- or 6-membered ring;

$R^1$ is an alkylene or substituted alkylene group;

X is —OJO—, —OJ—, —JO—, —OJNR$^3$—, —NR$^3$J—, —NR$^3$JNR$^3$, —JNR$^3$— or —NR$^3$JO—;

J is CO or SO$_2$;

$R^3$ is hydrogen; a substituted or unsubstituted alkyl group of from 1 to about 10 carbon atoms; a substituted or unsubstituted aryl group of from about 6 to about 10 carbon atoms; or represents the atoms which when taken together with $R^2$ forms a 5- or 6-membered ring;

$R^2$ is a substituted or unsubstituted alkyl group of from 1 to about 10 carbon atoms; a cycloalkyl group of from about 5 to about 7 carbon atoms; a substituted or unsubstituted aryl group of from about 6 to about 10 carbon atoms; or represents the atoms which when taken together with $R^3$ forms a 5- or 6-membered ring;

Z is hydrogen or represents the atoms which when taken together with R forms a 5- or 6-membered ring;

Y is a substituted or unsubstituted alkyl or alkoxy group of from 1 to about 6 carbon atoms or halogen; and n is a positive integer from 1 to 4; and said magenta dye having the formula:

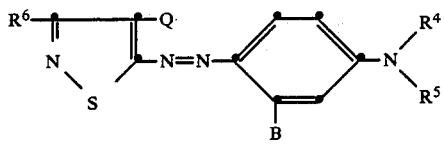

II wherein $R^4$ and $R^5$ may each independently be hydrogen, substituted or unsubstituted alkyl or allyl of from 1 to about 6 carbon atoms, substituted or unsubstituted cycloalkyl of from about 5 to about 7 carbon atoms, substituted or unsubstituted aryl of from about 5 to about 10 carbon atoms; or $R^4$ and $R^5$ may be taken together to form a ring; or a 5 or membered heterocyclic ring may be formed with $R^4$ or $R^5$, the nitrogen to which $R^4$ or $R^5$ is attached, and either carbon atom ortho to the carbon attached to said nitrogen atom;

$R^6$ may be may be hydrogen, substituted or unsubstituted alkyl of from 1 to about 6 carbon atoms, substituted or unsubstituted aryl of from about 5 to about 10 carbon atoms, alkylthio or halogen;

B may be substituted or unsubstituted alkyl of from 1 to about 6 carbon atoms, substituted or unsubstituted aryl of from about 5 to about 10 carbon atoms or NHA, where A is an acyl or sulfonyl radical; and Q may be cyano, thiocyanato, alkylthio or alkoxycarbonyl.

2. The element of claim 1 wherein said receiving layer comprises a polycarbonate binder having a $T_g$ greater than about 200° C.

3. The element of claim 2 wherein said polycarbonate is derived from a bisphenol component comprising a diphenyl methane moiety.

4. The element of claim 1 wherein said R in said structural formula I represents the atoms which are taken together with Z to form a 6-membered ring.

5. The element of claim 1 wherein said $R^6$ in said structural formula II is methyl and Z is CN.

6. The element of claim 1 wherein said pattern consists of a set of red, green and blue additive primaries.

7. The element of claim 6 wherein each area of said primary color and each said set of primary colors are separated from each other by an opaque area.

8. The element of claim 1 wherein said thermally transferred image is obtained using laser induction.

9. The element of claim 1 wherein said thermally transferred image is obtained using a high intensity light flash.

10. The element of claim 1 wherein said support is glass.

11. A process of forming a color filter array element comprising
(a) imagewise heating a dye donor element comprising a support having thereon a dye layer, and
(b) transferring portions of said dye layer to a dye receiving element comprising a transparent support having thereon a dye-receiving layer, said imagewise heating being done in such a way as to Produce a repeating mosaic pattern of dyes to form said color filter array element, one of said dyes being a mixture of a yellow dye and a magenta dye to form a red hue, said yellow dye having the formula:

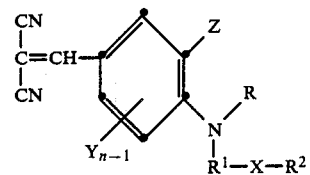

I wherein
R is a substituted or unsubstituted alkyl group of from 1 to about 10 carbon atoms; a cycloalkyl group of from about 5 to about 7 carbon atoms; or represents the atoms which when taken together with Z forms a 5- or 6- membered ring;

$R^1$ is an alkylene or substituted alkylene group;

X is —OJO—, —OJ—, —JO—, —OJNR$^3$—, —NR$^3$J—, —NR$^3$JNR$^3$—, —JNR$^3$— or —NR$^3$JO—;

J is CO or SO$_2$;

$R^3$ is hydrogen; a substituted or unsubstituted alkyl group of from 1 to about 10 carbon atoms; a substituted or unsubstituted aryl group of from about 6 to about 10 carbon atoms; or represents the atoms which when taken together with $R^2$ forms a 5 or 6 membered ring;

$R^2$ is a substituted or unsubstituted alkyl group of from 1 to about 10 carbon atoms; a cycloalkyl group of from about 5 to about 7 carbon atoms; a substituted or unsubstituted aryl group of from about 6 to about 10 carbon atoms; or represents the atoms which when taken together with $R^3$ forms a 5- or 6-membered ring;

Z is hydrogen or represents the atoms which when taken together with R forms a 5- or 6-membered ring;

Y is a substituted or unsubstituted alkyl or alkoxy group of from 1 to about 6 carbon atoms or halogen; and n is a positive integer from 1 to 4; and said magenta dye having the formula:

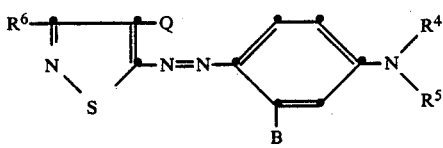

wherein $R^4$ and $R^5$ may each independently be hydrogen, substituted or unsubstituted alkyl or allyl of from 1 to about 6 carbon atoms, substituted or unsubstituted cycloalkyl of from about 5 to about 7 carbon atoms, substituted or unsubstituted aryl of from about 5 to about 10 carbon atoms; or $R^4$ and $R^5$ may be taken together to form a ring; or a 5 or 6 membered heterocyclic ring may be formed with $R^4$ or $R^5$, the nitrogen to which $R^4$ or $R^5$ is attached, and either carbon atom ortho to the carbon attached to said nitrogen atom;

$R^6$ may be hydrogen, substituted or unsubstituted alkyl of from 1 to about 6 carbon atoms, substituted or unsubstituted aryl of from about 5 to about 10 carbon atoms, alkylthio or halogen;

B may be substituted or unsubstituted alkyl of from 1 to about 6 carbon atoms, substituted or unsubstituted aryl of from about 5 to about 10 carbon atoms or NHA, where A is an acyl or sulfonyl radical; and Q may be cyano, thiocyanato, alkylthio or alkoxycarbonyl.

12. The process of claim 11 wherein said receiving layer comprises a polycarbonate binder having a $T_g$ greater than about 200° C.

13. The process of claim 12 wherein said polycarbonate is derived from a bisphenol component comprising a diphenyl methane moiety.

14. The process of claim 11 wherein said R in said structural formula I represents the atoms which are taken together with Z to form a 6-membered ring.

15. The process of claim 11 wherein said $R^6$ in said structural formula II is methyl and Z is CN.

16. The process of claim 11 wherein said dye donor element contains a light-absorbing material in addition to said dyes.

17. The process of claim 16 wherein a laser is used to supply energy in said imagewise heating step.

18. The process of claim 16 wherein a high intensity light flash is used to supply energy in said imagewise heating step.

19. The process of claim 11 which includes a further step of heating the transferred image to further diffuse the dye into said dye-receiving layer.

20. The process of claim 11 which includes a further step of subjecting the transferred image to solvent vapor to further diffuse the dye into said dye receiving layer.

* * * * *